United States Patent [19]

Johnson et al.

[11] 4,422,384
[45] Dec. 27, 1983

[54] ALL POSITION TRACTOR

[75] Inventors: David E. Johnson, Pataskala; Kenneth E. McCall; William J. Coughlin, both of Lancaster, all of Ohio

[73] Assignee: Arcair Company, Lancaster, Ohio

[21] Appl. No.: 274,091

[22] Filed: Jun. 16, 1981

[51] Int. Cl.³ .......................... B23Q 9/00; B23K 7/10
[52] U.S. Cl. .................................. 105/29 R; 105/144; 104/119; 266/67; 173/32
[58] Field of Search .................. 105/29 R, 30, 215 R, 105/215 C, 216, 141, 144, 217; 248/646, 647, 651, 657; 104/118, 119, 120, 243, 245, 247, 261, 262; 173/31, 32, 24, 22, 23; 308/3 A, 3.6, 3.8, 3.9, 6 R; 238/1; 266/56, 67, 68, 69, 71; 409/124, 178, 179

[56] References Cited

U.S. PATENT DOCUMENTS

| Re. 28,121 | 8/1974 | Gulley | 173/32 |
|---|---|---|---|
| 117,257 | 7/1871 | Cass | 104/245 |
| 945,140 | 1/1910 | Rückert | 105/216 |
| 2,474,153 | 6/1949 | Livesay | 266/23 |
| 2,718,195 | 9/1955 | Bock et al. | 105/215 C |
| 3,176,587 | 4/1965 | Appleton et al. | 90/13.5 |
| 3,226,027 | 12/1965 | Cable et al. | 238/1 |
| 3,259,021 | 7/1966 | Appleton et al. | 90/13 |
| 3,374,974 | 3/1968 | Furrer et al. | 104/119 |
| 4,158,315 | 6/1979 | Kensrue et al. | 266/67 |

OTHER PUBLICATIONS

Arcair Company, Travel Systems for the Welding and Cutting Industries, 1973.
M. K. Products, Inc., Pack Rat Travel Carriage System 1977.

Primary Examiner—Robert B. Reeves
Assistant Examiner—Richard Mathieu
Attorney, Agent, or Firm—James C. Simmons; E. Eugene Innis

[57] ABSTRACT

A tractor assembly for mounting on a track fixed to a workpiece the tractor used to support and guide a metal-working tool along a fixed path, the tractor having three wheels to engage opposite edges of the track, one of said wheels being laterally displaceable to facilitate mounting of the tractor to the track. The invention also includes rest buttons or supports to facilitate alignment and mounting of the tractor and additional roller supports engageable to said track if needed.

5 Claims, 7 Drawing Figures

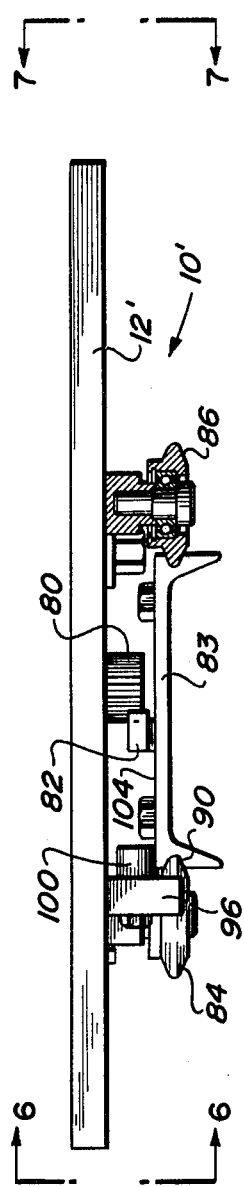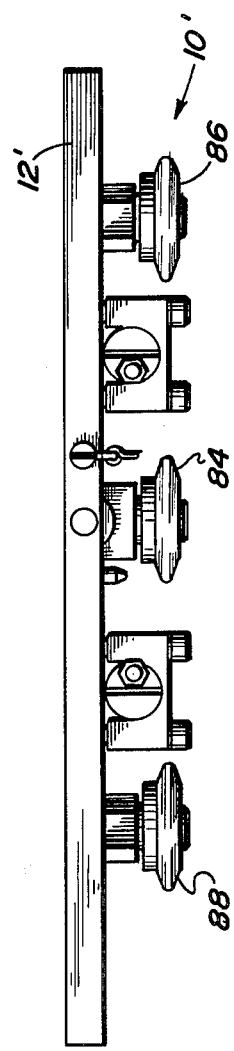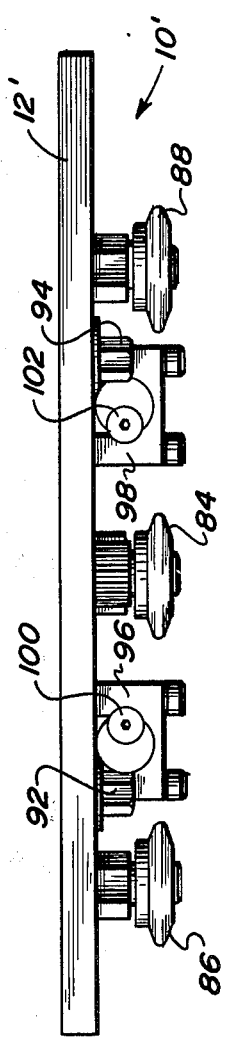

ALL POSITION TRACTOR

TECHNICAL FIELD

The present invention pertains to tractors or tool positioning devices or travel systems utilized for supporting and guiding a metal working tool along a fixed path on a workpiece. Such tractors are propelled along a track which is fixed to the workpiece in relation to the place where the tool is to act, said track being positioned by magnets, vacuum chucks or the like. Among other devices these tractors are used to carry conventional Air Carbon-Arc Cutting and Gouging equipment, welding equipment or machine tools over the surface of a structure or a structural shape such as a steel plate to produce a gouge, machined surface or groove and or a finished weldment.

BACKGROUND OF THE PRIOR ART

Tractors used to carry a metal working tool along a fixed path on a workpiece, their operation over the associated track are adequately shown and described in U.S. Pat. No. Re. 28,121 granted Aug. 20, 1974. The Arcair Company of Lancaster, Ohio offers an all position, multipurpose remote controlled tractor of this type under the trademark CLIMBER.

Another widely used device is that shown in U.S. Pat. No. 2,474,153. The apparatus of the '153 patent employs four guiding wheels with a tapered cross-section. The thinnest part of the tapered wheel is at the largest diameter of the wheel, the wheels adapted to mate with a complimentary shape on a track fixed to a workpiece.

In addition to the foregoing, a method of mounting a track to the workpiece is shown in U.S. Pat. No. 3,226;027.

U.S. Pat. Nos. 3,176,587 and 3,259,021 disclose attempts to improve a tool carrying device by using a three wheeled configuration. The third wheel of these devices is directly coupled to the motor and is permitted to pivot about a point to compensate for changes in curvature in the track, misalignment of joints and the like.

BRIEF SUMMARY OF THE INVENTION

The present invention relates to a tractor for supporting and guiding a metal working tool along a fixed path wherein a tool supporting platform or base plate having the general shape of a perpendicular sided polygon, e.g. rectangle or square, is used to support the driving means as well as a three wheeled arrangement for mounting the platform to the track. The three wheels are arranged so that they lie in a triangular array in a plane parallel to and below the base plate with the wheel positioned at the apex of the triangle moveable toward and away from the other two wheels so that the platform can be readily mounted to the track. Movement of the third wheel is accomplished by means of a slide action and locking device so that once in position lateral movement of the third wheel is restrained. In addition, rest buttons or supports are placed near the wheels so that the entire tractor can be positioned on the track and readily mounted thereto. In addition, in one embodiment, roller supports are provided which are cam actuated and can be brought into contact with the surface of the track for added support. When not needed the rollers can be moved out of contact with the track.

In both embodiments the tractor includes cam actuated means for causing a gear on the drive motor to engage a complimentary rack on the track to provide means for driving the tractor along the track.

Utilization of a base plate provides a large area for carrying tools and minimizes lateral movement of the carriage as it proceeds along the track by permitting centering of trailing hoses, electrical connections and the like in relation to the center line of travel.

BRIEF DESCRIPTION OF THE DRAWING

FIG. 5 is a front elevational view of an apparatus according to the invention showing an alternate rail engaging means as well as auxiliary supporting means.

FIG. 6 is an elevational view taken along the lines 6—6 of FIG. 5.

FIG. 7 is an elevational view taken along the lines 7—7 of FIG. 5.

DETAILED DESCRIPTION OF THE INVENTION

Figure 1:
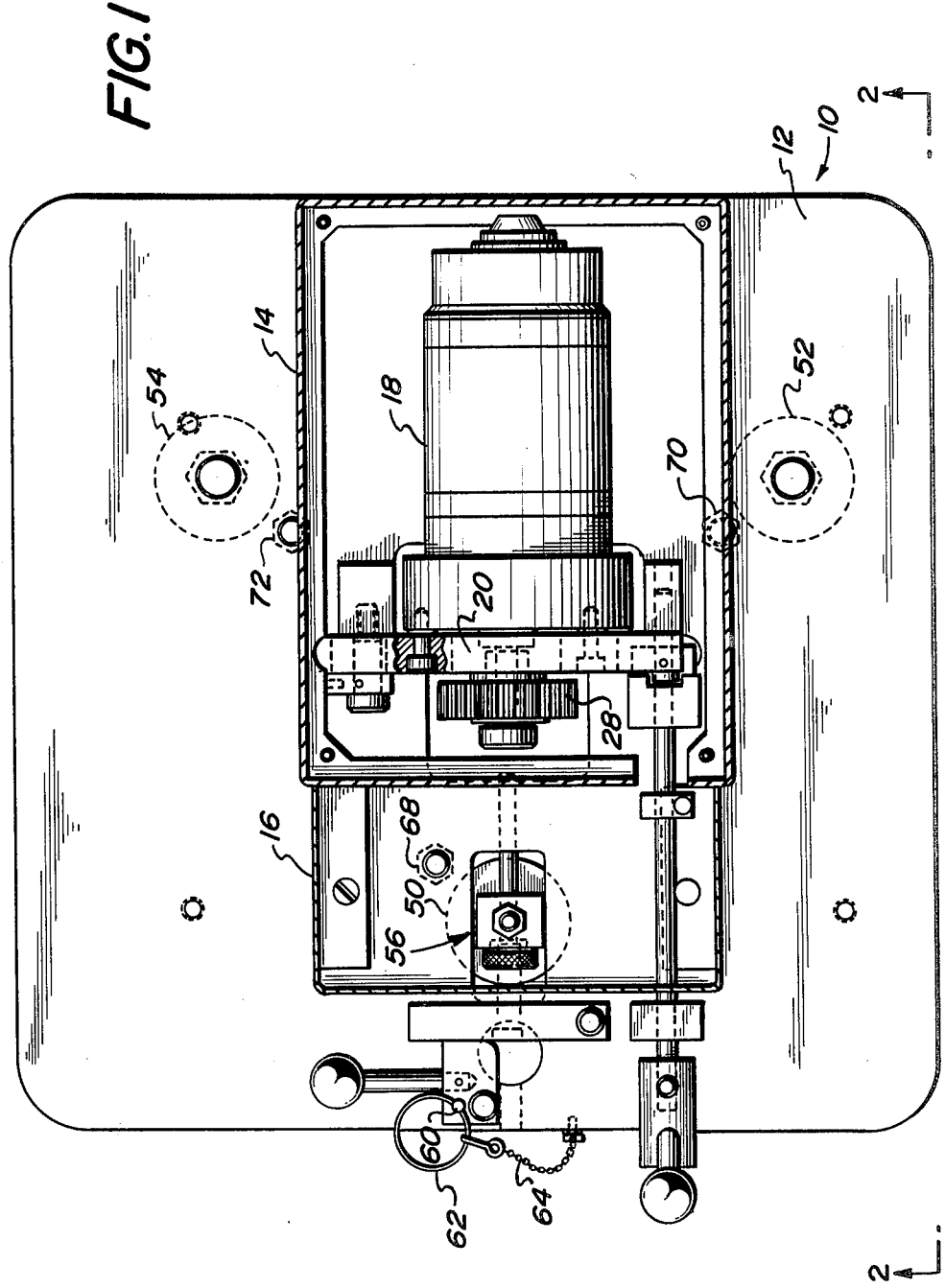
FIG. 1 is a top plan view partially in section of an apparatus according to a first embodiment of the present invention.

Mechanized devices to move welding, cutting and/or testing equipment along a linear controlled path have been available on the market for a number of years. Track, attachable to the workpiece by means of magnets or suction cups, permit a metal working tool (e.g. gas cutting or welding, Air Carbon-Arc Cutting or Gouging, mechanical machine or the like) to be moved horizontally, vertically, or circumferentially or along any other path that can be defined by the track.

Present devices share common defects among which light duty design is one so that the apparatus cannot carry heavier metal working or testing equipment. Some of the heavier designs have a very high center of gravity which provides normal off-center loading of the metal working or testing equipment causing serious deflection of the track which is generally aluminum thus increasing the track wear. Some devices of the prior art type require positioning the carriage on the end of the track only which makes set up very difficult. Those prior art devices such as sold by MK Products, Inc. of Irvine, Calif. have a high center of gravity, thus making it difficult in engage and lock the wheels to the track. It has been known to require two people to install equipment of this type. Lastly, there are a number of geometries of extruded aluminum track on the market, thus making it necessary to have the tractor made for the specific track purchase.

The apparatus of the present invention has for its purpose to provide:

(a) a sturdy, heavy duty speed controllable tractor to carry metal working tools and/or testing equipment in any position that can be defined by the associated track.

(b) a tractor having a low center of gravity so as to permit off-center loading of metal working equipment or testing equipment with a minimum deflection of the track.

(c) a tractor having a maximum of equipment mounting area.

(d) a tractor which would be installable at any point on the track and positionable so as to make securing and locking guide wheels a simple task for a single operator regardless of the position of the equipment.

(e) in one embodiment to provide a tractor which would have additional rolling support members so as to minimize track wear.

(f) to provide all of the embodiments of a tractor with variations of drive mechanisms that can be used to accommodate the major extruded aluminum track geometries available in the market place.

Referring to the drawing and particular to the embodiment of FIGS. 1 through 4, the tractor 10 includes a base plate or tool mounting platform 12, the tool mounting platform or base plate 12 having the shape of a polygon with four perpendicular sides, e.g. square or rectangle. For ease of manufacture and for safety, the corners of the base plate 12 can be rounded as shown in the drawing. Mounted on top of the base plate 12 is a motor housing 14 and a control box 16. Disposed within the motor housing 14 is a 90 volt DC, 48 amp. 1/30 horse power, 2900 rpm with a 96:1 ratio motor 18. Motor 18 is fixed through a motor mounting plate 20 to a spur gear 28, which in turn through an idler gear assembly 30 meshes with a rack 32 on extruded aluminum rail 34. Engagement of the motor 18 is accomplished through a cam actuated lever apparatus 36 manipulated by knob 38 as is well known in the art. Motor 18 includes a pair of fuse holders 40, 42 and the associated electrical power line 44 so that the motor can be actuated. Control housing 16 includes a motor control unit (not shown) which is connected by suitable electrical feed through 46 to motor 18 as is also well known in the art.

Motor housing 14 can include a standard electrical receptacle 46 which can be used to power accessory equipment carried by the tractor 10.

Figure 2:
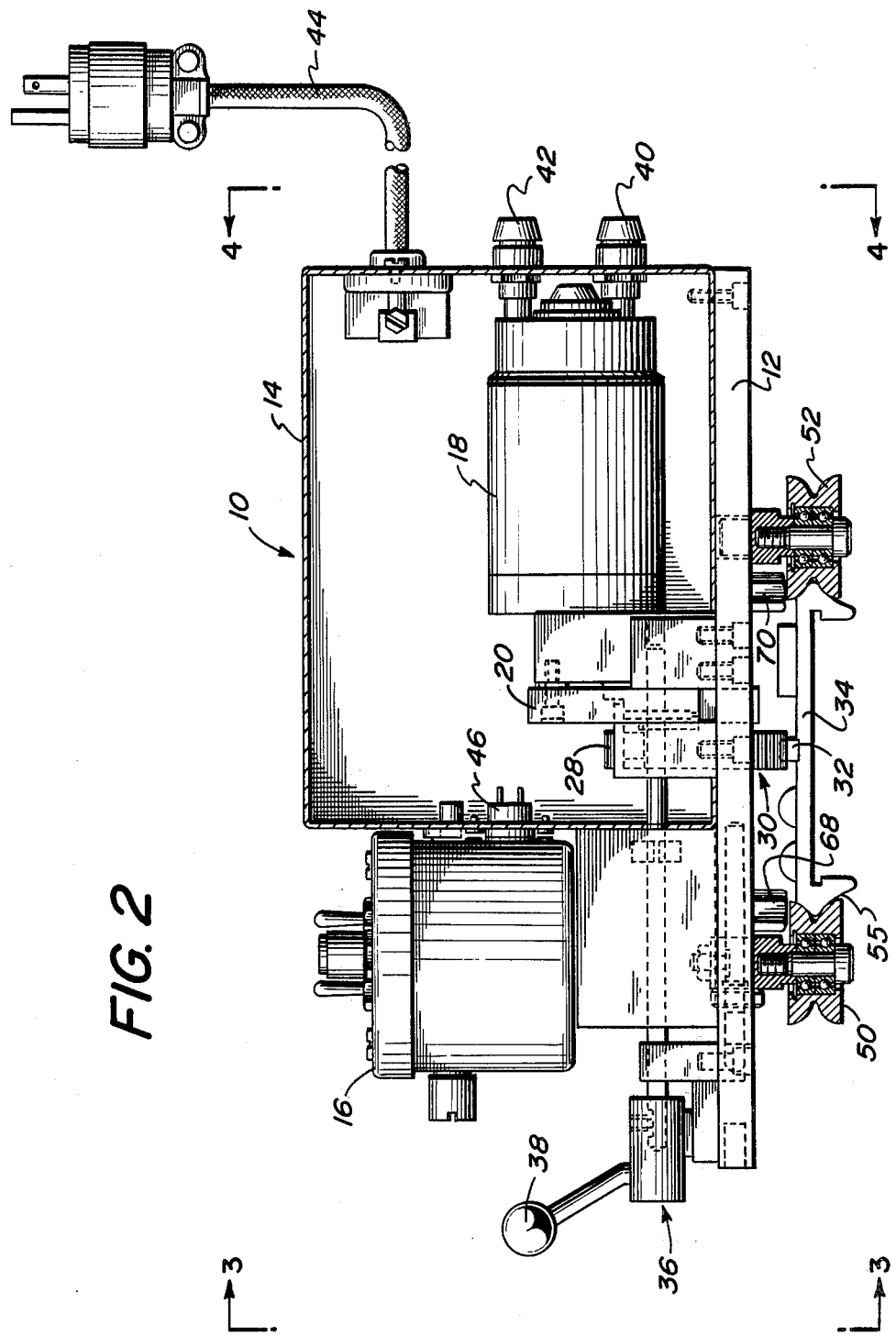
FIG. 2 is an elevational view partially in section taken along the lines 2—2 of FIG. 1.
Figure 3:
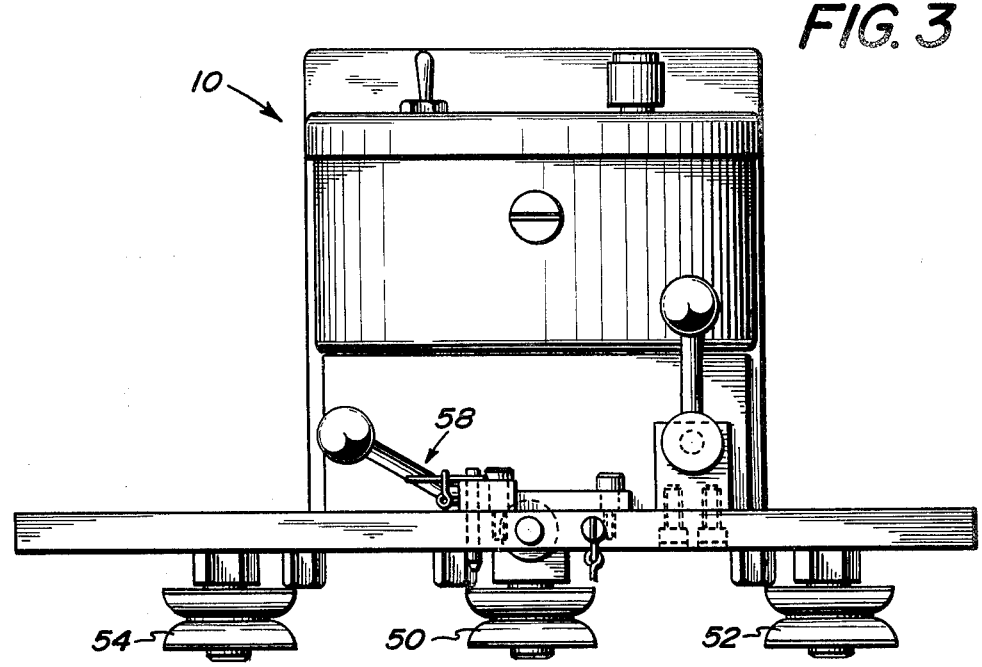
FIG. 3 is an elevational view taken along the lines 3—3 of FIG. 2.
Figure 4:
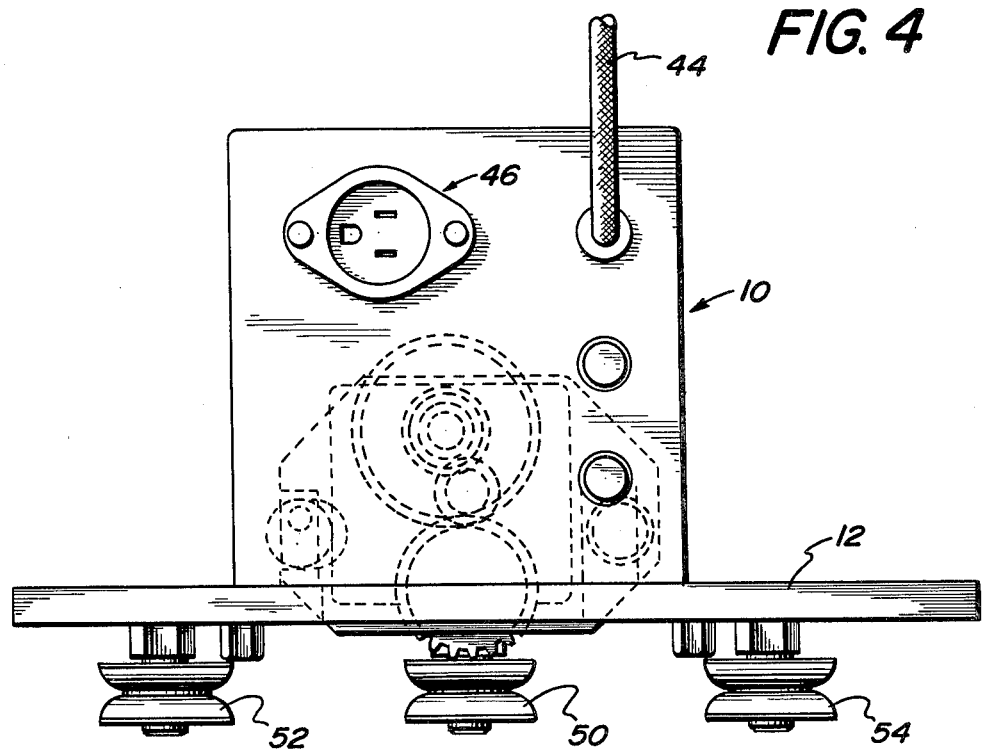
FIG. 4 is an elevational view taken along the lines 4—4 of FIG. 2.

As shown in FIGS. 2, 3 and 4 depending from base plate 12 are track mounting wheels 50, 52 and 54. Each of the wheel assembly's, 50, 52 and 54 are mounted for rotation about a vertical axis which vertical axis is perpendicular to base plate 12. Each of the wheels 50, 52 and 54 contains a peripheral groove which groove is adapted to mate with a complimentary shape 55 on the outer edges of track 34 as is shown in FIG. 2. Furthermore, as shown in FIG. 1, the wheels 50, 52 and 54 are placed such that a line drawn (FIG. 1) through the point of the vertical axes of each wheel would define a triangle. Furthermore, as shown in FIGS. 2, 3 and 4 wheels 50, 52 and 54 are mounted such that they lie in a plane which plane is parallel to the bottom of base plate 12. Wheels 52 and 54 are in a fixed position on base plate 12. Wheel 50 (FIG. 1) is mounted to a slide mechanism 56 which permits the wheel 50 to be moved in a direction toward or away from wheels 52, 54 so that wheel 50 can be moved to either release or mount the tractor 10 to the track 34. The slide mechanism 56 is controlled through a knob and lever mechanism 58 (FIG. 3) as is well known in the art. A suitable pin 60 is used to lock the slide mechanism in position, the pin being monitored by use of a ring 62 and chain 64.

Depending from base plate 12 are a plurality of rest buttons or stops 68, 70 and 72. The rest buttons or supports 68, 70 and 72 are positioned so that they will not contact the top surface of the track 34 as the tractor moves along the track. However, rest buttons 68, 70 and 72 can be used to place the tractor on the surface of the track so that the wheels can be readily engaged without having the tractor tip from side to side while the operator tries to position the tractor and engage wheel 50 at the same time.

The apparatus of FIGS. 5, 6 and 7 is similar to that of the apparatus of FIGS. 1 through 4 except that the motor (not shown) is mounted for disposition of the drive shaft in a vertical direction, the drive shaft containing on its end a gear 80 which in turn meshes with a horizontal rack 82 on the track 83. The supporting wheels 84, 86 and 88 are mounted in an identical fashion to that of the apparatus of FIGS. 1 through 4 except that the wheels 84, 86 and 88 have a tapered peripheral section with the major diameter of each wheel being thinner than the balance of the circumference of the wheel. Each wheel is used to mate with a complimentary groove 90 in track 83 as is shwon in FIG. 5. The apparatus of FIGS. 5 through 7 contains a pair of rest buttons or supports 92, 94 (FIG. 7) disposed adjacent wheels 86, 88 in order to support the tractor 10' while it is placed on the rail 83. Disposed on either side of slideable wheel 84, which wheel is mounted in identical fashion to wheel 50 of the apparatus of FIGS. 1 through 4 are roller supports 96, 98 which contain cam actuated rollers 100 and 102. As shown in FIG. 5 the roller supports 96, 98 are mounted on base plate 12' so that they do not touch the rail 83. However, rollers 100 and 102 can be moved to contact with the top surface 104 of rail 83 to provide additional support for the tractor 10'. This is particularly necessary if the track being used has a thin cross-section or where there are unusual loads on the tractor 10'. The device of FIGS. 5 through 7 operates in a manner identical to the apparatus of FIGS. 1 through 4 in that the single wheel 84 is slideable so that it can be moved toward or away from the fixed wheels 86, 88 to facilitate mounting of the tractor to the track.

As stated above, certain criteria were decided upon in order to develop the apparatus of the instant invention. It is believed that all of the criteria were satisfied with the present invention. The design incorporates the principal of using three guide wheels to minimize misalignment regardless of track position and at joints of successive track sections. The design of the present invention consists of a large rectangular base plate which can be fixed close to the track, thus permitting equipment and motive apparatus to be mounted close to the track for the lowest center of gravity possible with an all position tractor. The apparatus of the present invention provides one adjustable, lockable guide wheel and means for adjusting two variations of drive mechanisms to engage the two major track designs. Multiple rest blocks are included which mate with the surface of either style of track so that it is easy for a single operator to install the tractor to the track and lock the wheels in place. The apparatus of the present invention encompasses two different guide wheels to facilitate use with the two major track geometries. In one embodiment, rotatable support devices are used to distribute the load over a larger area of track surface when a lighter track is used. Devices according to the present invention provide means for distributing the pulling load of the equipment being carried to the guide wheels on either type of track and thus reduce track wear. With an apparatus according to the present invention associated hoses and electrical conduits can be trailed along the center line of the track thus stabilizing the tractor and minimizing lateral movement and thus wear on the track.

Having thus described our invention what is desired to be secured by Letters Patent of the United States is set forth in the appended claims.

What I claim is:

1. A tractor adapted for mounting on an elongated track fixed to a workpiece so that said tractor can carry a metal working tool along a fixed path defined by said track, comprising in combination:

a base plate having four sides generally perpendicular to each other, said base plate adapted to have a low center of gravity and to position associated drive means and accessory equipment along the center line of said track;

drive means mounted on said base plate and adapted to mate with means on said track to propel said tractor along said track;

depending from said base plate a first pair of wheels mounted for rotation about an axis perpendicular to said base plate, said axes generally parallel to one side of said base plate, said first pair of wheels adapted to support said tractor on said track by frictionally engaging one side of said track;

a third wheel depending from said base plate and mounted for rotation about an axis perpendicular to said base plate, said wheel being in a plane defined by said first pair of wheels and said third wheel said plane generally parallel to but spaced below said base plate, said third wheel positioned so that the axes of rotation of said wheels in said plane define a triangle with the axis of said third wheel being at the apex of said triangle, said third wheel further adapted to be moved in a direction generally perpendicular to a line extending between and perpendicular to the axes of rotation of said pair of wheels; whereby said third wheel can be moved laterally from said pair of wheels to permit ready mounting of said tractor to said track; and a plurality of rests buttons depending from said base plate said rest buttons adapted to aid positioning of said tractor to said track without contacting said track during operation of said tractor.

2. A tractor according to claim 1 wherein there are a plurality of cam actuated rollers disposed beneath said base plate said rollers being positionable to contact said track to provide additional support for said base plate during operation of said tractor.

3. A tractor according to claim 1 wherein said wheels contain circumferential grooves adapted to engage a complimentary shaped projection on opposite longitudinal sides of said track.

4. A tractor according to claim 1 including cam-actuated gear drive means adapted to be removably engaged to a gear rack on said track for moving said tractor along said track.

5. A tractor according to claim 1 wherein said wheels include a tapered circumferential surface having a thinner portion at the maximum diameter of said wheels, said wheels adapted to engage a complimentary shaped recess on longitudinal sides of said track.

* * * * *